G. R. FARRELL.
VEHICLE WHEEL.
APPLICATION FILED SEPT. 12, 1918.

1,309,473.

Patented July 8, 1919.

Inventor
George R. Farrell
By
S. T. Thomas
Attorney

UNITED STATES PATENT OFFICE.

GEORGE R. FARRELL, OF DETROIT, MICHIGAN.

VEHICLE-WHEEL.

1,309,473.   Specification of Letters Patent.   Patented July 8, 1919.

Application filed September 12, 1918. Serial No. 253,794.

*To all whom it may concern:*

Be it known that I, GEORGE R. FARRELL, citizen of the United States, residing at Detroit, county of Wayne, State of Michigan, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

My invention relates to motor driven vehicles, and its purpose is to provide an adjustable attachment for the wheels of a vehicle which may be permanently carried by the spokes so as to increase the traction of the wheels when required that the vehicle may readily move over roads unfavorable for traffic purposes.

One object of the invention is to provide a construction which may be readily clamped upon the spokes of a wheel and which may be adjusted radially to meet existing road conditions.

Another object of the invention is to direct attention to the unauthorized use of the vehicle during the absence of the owner or regular driver.

With the foregoing and other objects in view, which will appear as the description proceeds, the invention resides in the combination and arrangement of parts, and in the details of construction hereinafter described and claimed, it being understood that changes may be made in the precise embodiment herein disclosed without departing from the spirit of the invention.

In the accompanying drawings:—

Figure 2:
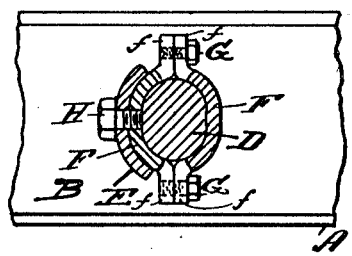
Fig. 2 is a fragmentary detail view showing a section through one of the spokes and members clamped thereto, taken on line 2—2 of Fig. 1.
Figure 3:
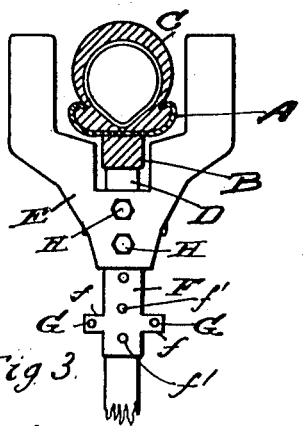
Fig. 3 is a fragmentary sectional view on line 3—3 of Fig. 1.
Figure 1:
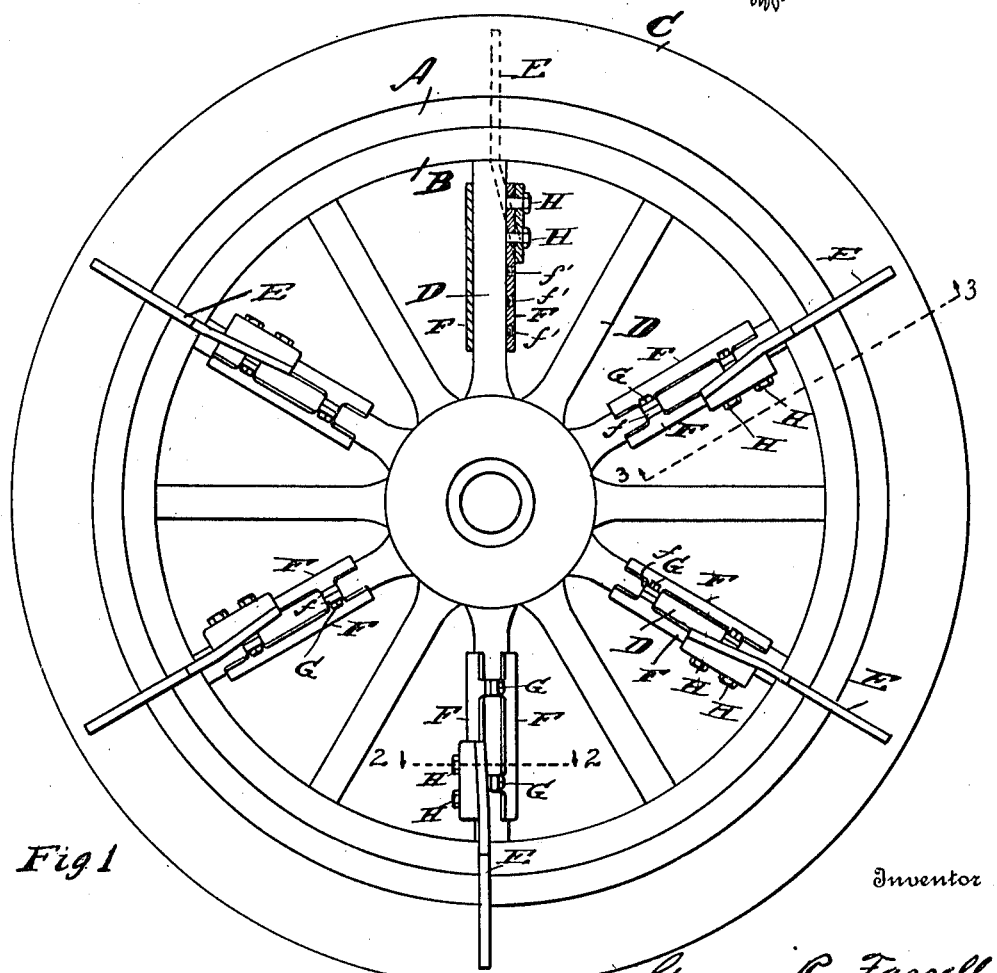
Figure 1 is a side elevation of a vehicle wheel showing adjustable hooks or paddles secured to the spokes of the wheel.

Referring now to the letters of reference placed upon the drawings:—

A, indicates the rim of a wheel, B, the felly to which the rim is secured, and C, denotes a tire mounted upon the rim. D, designates the spokes of a wheel.

E, indicates an adjustable forked hook or paddle adapted to straddle the rim and tire. F, F are co-acting members clamped upon the spokes by bolts G, G, extending through lugs *f, f*, projecting from the edges of said members.

H, H, are bolts for adjustably securing the hook or paddle E to one of the co-acting members F, F—provided with a plurality of holes *f'* to receive the same and whereby the paddles may be radially adjusted as required.

It will now be apparent that through a limited outward adjustment of the hooks any tendency of the wheels to "skid" may be overcome, and should the vehicle become "mired" by extending the hooks to a greater degree the vehicle may extract itself under its own power even though the road conditions were unfavorable.

And so also by an outward adjustment of one of the hooks to a greater extent than the others—the hook being secured in its adjusted position—attention would by this means be directed to any attempt on the part of a maliciously inclined person to drive away the car during the absence of the owner because of the resultant irregular action or movement of the vehicle that would thereby obtain.

Having thus described my invention, what I claim is:—

In a device of the character described, a pair of co-acting members adapted to embrace the spokes of a wheel and having projecting lugs with apertures for the passage of connecting bolts, bolts for securing said members together upon the spokes of a wheel, a bifurcated paddle adapted to straddle the rim and tire of a wheel having an apertured shank for the passage of bolts, and bolts for securing the bifurcated paddle to one of said co-acting members provided with a plurality of apertures for the entry of said last named bolts, whereby said paddle may be radially adjusted as required.

In testimony whereof, I sign this specification in the presence of two witnesses.

GEORGE R. FARRELL.

Witnesses:
 S. E THOMAS,
 L. S. WOODHULL.